United States Patent
Utsunomiya et al.

(10) Patent No.: US 6,225,245 B1
(45) Date of Patent: *May 1, 2001

(54) SILICA GEL, SYNTHETIC QUARTZ GLASS POWDER AND SHAPED PRODUCT OF QUARTZ GLASS

(75) Inventors: Akira Utsunomiya; Yoshio Katsuro; Akihiro Takazawa; Takashi Moriyama, all of Kitakyushu (JP)

(73) Assignee: Mitsubishi Chemical Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/974,679

(22) Filed: Nov. 19, 1997

(30) Foreign Application Priority Data

Nov. 20, 1996 (JP) .................................................. 8-309177
Dec. 18, 1996 (JP) .................................................. 8-338203

(51) Int. Cl.$^7$ ................................ C03C 3/06; C03B 8/02
(52) U.S. Cl. ............................ 501/54; 501/12; 65/17.2; 423/338
(58) Field of Search ........................ 501/12, 54; 65/17.2; 423/338

(56) References Cited

U.S. PATENT DOCUMENTS

| | | | | |
|---|---|---|---|---|
| 3,977,993 | * | 8/1976 | Lynch | 252/317 |
| 4,979,973 | * | 12/1990 | Takita et al. | 501/12 |
| 5,021,073 | * | 6/1991 | Takita et al. | 501/12 |
| 5,028,247 | * | 7/1991 | Asami et al. | 501/12 |
| 5,141,786 | * | 8/1992 | Shimizu et al. | 501/12 |
| 5,202,104 | * | 4/1993 | Watanabe et al. | 423/335 |
| 5,211,733 | * | 5/1993 | Fukao et al. | 501/12 |
| 5,302,556 | * | 4/1994 | Shimizu et al. | 501/12 |
| 5,516,350 | * | 5/1996 | Onoda et al. | 65/17.2 |
| 5,604,163 | * | 2/1997 | Endo et al. | 501/12 |

FOREIGN PATENT DOCUMENTS

| | | | |
|---|---|---|---|
| 4-83711 | * | 3/1992 | (JP) . |
| 4-238808 | * | 8/1992 | (JP) . |
| WO 96/00702 | | 1/1996 | (WO) . |

OTHER PUBLICATIONS

Patent Abstracts of Japan, vol. 8, No. 218 (C–245), Oct. 4, 1984, JP 59–102838, Jun. 14, 1984.
Patent Abstracts of Japan, vol. 8, No. 260 (C–254), Nov. 29, 1984, JP 59–137340, Aug. 7, 1984.
Database WPI, Derwent Publications, AN 79–107188, JP 53–147710, Dec. 22, 1978.

\* cited by examiner

*Primary Examiner*—Karl Group
(74) *Attorney, Agent, or Firm*—Oblon, Spivak, McClelland, Maier & Neustadt, P.C.

(57) ABSTRACT

A synthetic quartz powder obtained by calcining a powder of silica gel, characterized in that white devitrification spots having sizes of larger than 20 $\mu$m in diameter formed in an ingot obtained by vacuum melting the synthetic quartz powder at a temperature of from 1780 to 1800° C. to form an ingot, followed by maintaining the ingot at a temperature of 1630° C. for 5 hours, are at most 10 spots/50 g.

17 Claims, No Drawings

SILICA GEL, SYNTHETIC QUARTZ GLASS POWDER AND SHAPED PRODUCT OF QUARTZ GLASS

The present invention relates to a synthetic quartz glass powder suitable for use in a semiconductor field, particularly for a high purity quartz glass part material suitable for use in a high temperature region of at least 1000° C. and for the production thereof.

Heretofore, a crucible, a jig or the like which is useful for production of a semiconductor single crystal, has been produced by melting a natural quartz powder obtained by pulverizing natural quartz. However, natural quartz contains various metal impurities even when it is of good quality, and, as such, has not been fully satisfactory from the viewpoint of the purity. Especially for a high purity single crystal required along with the progress in high performance in the semiconductor industry, inclusion of metal impurities adversely affects the performance of a semiconductor, and a crucible, a jig or the like which is feared to bring about inclusion of metal impurities or the like, can not be used.

Accordingly, for glass products to be used in the semiconductor industry or the like, a very strict control is carried out with respect to their quality. Such high purity glass is produced mainly by e.g. (1) a method in which natural quartz is highly purified for use, (2) a gas phase synthetic method wherein a fume formed by hydrolysis and thermal decomposition of a gaseous silicon compound such as silicon tetrachloride in an oxyhydrogen flame, is used, and it is subjected to melt-forming, or (3) a method wherein a synthetic quartz powder is used, which is obtained by calcining a silica gel powder which is in turn obtained by hydrolysis, gelation or the like of a silicon alkoxide or the like in a liquid phase.

However, the method (1) has a problem that there is a limit in reduction of the content of minor impurities, and the method (2) has a problem that the production cost is extremely high. By the method (3) wherein a silica gel, particularly a silica gel powder prepared by using a silicon alkoxide as the staring material, is used, it is possible to obtain a synthetic quartz glass having a low content of minor impurities inexpensively as compared with the method (2), but this method (3) does not necessarily satisfy the required level.

For example, a crucible for pulling up a silicon single crystal, is used at a high temperature of from 1400 to 1500° C. for a long period of time. Particularly, in recent years, it has become common to employ a continuous pulling up method which is carried out while continuously supplying a starting material silicon, whereby the period of time of using the crucible is further prolonged. The glass phase (amorphous) constituting the crucible is a metastable phase. Accordingly, if held in the above mentioned temperature range for a long period of time, it tends to convert into crystalline (crystballite) as a stable phase. Especially when metal impurities, etc. exist, they serve as crystal nuclei and further promote crystallization. If this phenomenon (generally called devitrification) takes place during pulling up of a single crystal, a crystalline portion formed along the inner wall of the crucible is likely to peel off and enter into the silicon melt, thereby to hinder single crystallization ("Science of Silicon" compiled by UCS Semiconductor Substrate Technology Study Group, 1996). On the other hand, also with respect to a core tube used for e.g. heat treatment of a silicon wafer, although the temperature of its use is low, if devitrification takes place due to its use for a long period of time, such devitrification causes a decrease in strength or breakage due to repetition of heating and cooling, since the thermal expansion coefficient differs between the crystalline portion and the amorphous portion. A synthetic quartz glass is considered to be hardly devitrified, since its content of metal impurities is very low as compared with a natural rock crystal powder, but a devitrification phenomenon of a problematic level has still been sometimes observed.

In view of the above problems, the present inventors have conducted an extensive study to obtain a synthetic quartz glass powder which undergoes no devitrification when used at a high temperature in the form of a shaped product. As a result, it has been found that a synthetic quartz glass powder obtained by applying certain specific treatment to a silicon alkoxide, water and an organic solvent such as an alcohol, used as starting materials, is able to prevent devitrification of a shaped product obtained by melt-forming such a synthetic quartz glass powder. The present invention has been accomplished on the basis of this discovery. Namely, it has been found that a substantial effect for suppressing crystallization can be obtained when a silicon alkoxide, water and an organic solvent such as an alcohol used as the starting materials, are preliminarily passed through a filter prior to their introduction into the reaction system.

Further, it has been found that by the commonly employed method for measuring minor metal impurities in glass wherein the residue obtained by dissolving a quartz glass powder with hydrofluoric acid, is dissolved and extracted by nitric acid, sulfuric acid or the like, followed by ICP analysis or an atomic absorption analysis, the degree of the influence over the devitrification phenomenon can not be distinguished. Accordingly, as described in detail hereinafter, the devitrification phenomenon is considered to be dependent not only on the absolute amount of inclusion of the impurities but also on the form in which the impurities exist. Accordingly, unless an analytical method capable of distinguishing the form of impurities which causes this devitrification, can not be found out, it is difficult to properly deal with the problem of this devitrification. The present inventors have conducted an extensive study also on this problem and as a result, have found it possible to predict the degree of occurrence of this devitrification phenomenon in a shaped product of quartz glass obtained by melt-forming, by evaluating the synthetic quartz glass powder by means of a specific evaluation method. The present invention has been accomplished on the basis of this discovery.

Namely, the present invention provides a synthetic quartz powder obtained by calcining a powder of silica gel, characterized in that white devitrification spots having sizes of larger than 20 $\mu$m in diameter formed in an ingot obtained by vacuum melting the synthetic quartz powder at a temperature of from 1780 to 1800° C. to form an ingot, followed by maintaining the ingot at a temperature of 1630° C. for 5 hours, are at most 10 spots/50 g, etc.

Now, the present invention will be described in detail with reference to the preferred embodiments.

The synthetic quartz glass powder of the present invention is one obtained by calcining a silica gel powder, whereby white devitrification spots having sizes of larger than 20 $\mu$m in diameter formed in an ingot obtained by vacuum melting the synthetic quartz glass powder at temperature of from 1780 to 1800° C. to obtain an ingot, followed by maintaining it at a temperature of 1630° C. for 5 hours, are at most 10 spots/50 g. Namely, 50 g of the synthetic quartz glass powder is put into a heat resistant container such as a crucible and vacuum-melted at a temperature of from 1780 to 1800° C., followed by cooling, to obtain an ingot. This ingot is maintained at a temperature of 1630° C. for 5 hours, and then cooled. When the inside of this ingot is inspected, white spherical portions having sizes of from a few tens μm to 1 mm are sometimes observed, and they are problematic "devitrification spots". As a result of extensive researches by the present inventors, it has been found that there is a significant interrelation between the number of such "devitrification spots" formed and the crystallization occurring during use of a finally molded product, and that when a quartz glass part to be used at a high temperature, such as a crucible for pulling up a silicon single crystal, is prepared by using a synthetic quartz glass powder wherein devitrification spots having sizes of larger than 20 μm in diameter, are at most 5 spots/50 g, preferably at most 2 spots/50 g, no problematic crystallization phenomenon will take place even when this quartz glass part is used under usual conditions. Namely, it has been found by the present inventors that whether or not crystallization is likely to occur when a synthetic quartz glass powder is melt-formed and used as a final product, can be judged by the above mentioned accelerated evaluation method.

The sizes of the devitrification spots can be measured by enlarging them by means of e.g. an optical microscope. If the shapes of the devitrification spots are substantially spherical, their sizes are defined by their diameters. The shapes of the devitrification spots are sometimes not necessarily spherical, and in such a case, the sizes are defined by their longer diameters.

The mechanism for formation of devitrification spots is not clearly understood. However, it is considered that some nuclei-forming substance exists in the synthetic quartz glass powder, whereby crystallization takes place during its use at a high temperature. Accordingly, it is assumed effective to use e.g. a filter as described hereinafter.

As a method for producing a synthetic quartz glass powder to satisfy the present invention, a sol-gel method, particularly a sol-gel method by hydrolysis of an alkoxysilane, may be mentioned as a representative. As the alkoxysilane to be used as the starting material, a $C_{1-4}$ lower alkoxysilane such as tetramethoxysilane or tetraethoxysilane, or an oligomer as its low condensation product, is preferred, since the hydrolysis is easy, and carbon residue in the silica gel is little.

The amount of water to be used, is selected usually within a range of from 1 to 10 equivalents to the alkoxy groups in the alkoxysilane. In such a case, an organic solvent which is compatible with water, such as an alcohol or an ether, may be incorporated. The alcohol to be used, may, for example, be a lower aliphatic alcohol such as methanol or ethanol. In the present invention, at least one of the alkoxysilane and water is preliminarily passed through a filter prior to the initiation of the hydrolytic reaction. Specifically, at least one of the alkoxysilane and water may be passed through a filter and then introduced into the reactor. More preferably, both the alkoxysilane and water are subjected to the filter treatment. Still further preferably, all of the above mentioned starting material liquid and solvent are preliminarily passed through a filter prior to the hydrolytic reaction. The average opening diameter of the filter to be used is preferably at most 1 μm, more preferably at most 0.3 μm. The absolute filtration precision of the filter is preferably at most 1.5 μm, more preferably at most 0.5 μm, most preferably at most 0.3 μm. Here, the absolute filtration precision is the maximum diameter among those where the value of βx is 1 (the removal ratio of particles having a particle size of x μm is 100%), when the ratio βx in the number of particles between before and after the filtration is determined by the following formula for every particle size (x μm) by OSU F2 test.

βx=number of particles of at least x μm before filtration/number of particles of at least x μm after filtration Namely, with respect to the impurity substance influential over crystallization during the use of glass at a high temperature, a particulate foreign substance having a certain size is considered to be the main factor rather than one uniformly dispersed with a size of a molecular level. The material for the filter is preferably an organic polymer type (polypropylene, teflon or the like) or ceramic porous body having a little content of metal impurities.

To ensure the effect for preventing devitrification of a shaped product of quartz glass to be obtained, it is preferred to employ a multi-stage filter as the filter. Specifically, at least one of the alkoxysilane and water is preferably sequentially passed through filters having absolute filtration precisions of at most 0.5 μm, at most 0.2 μm and at most 0.1 μm, respectively. The excellent effect is believed to be attributable to the fact that foreign matters in the form influential over devitrification can thereby be certainly removed.

For this hydrolytic reaction, an acid such as hydrochloric acid or acetic acid, or an alkali such as ammonia, may be added as a catalyst. As a matter of course, all substances introduced to this reaction system must be of high purity.

Gelation of the hydrolyzed product is carried out under heating or at normal temperature. The gelation rate can be improved by heating. Accordingly, the gelation time can be adjusted by adjusting the degree of heating.

To obtain a silica gel, any conventional method may be employed without any particular restriction. However, rather than forming the silica gel as precipitates, it is usually preferred that the entirety is formed as a single jelly-like gel, which is pulverized to obtain a pulverized silica gel powder, which is subjected to the subsequent process, whereby the physical properties of the quartz powder obtained, will be particularly excellent, and no extra process such as separation from the supernatant, is required.

The silica gel thus obtained, may be further pulverized, as the case requires, to obtain a silica gel powder. Further, it is common to dry the silica gel prior to the calcining which will be described hereinafter. In such a case, the gel may be dried after pulverization or may be pulverized after drying. In any case, the pulverization is carried out so that the particle size after drying would be from 10 to 1000 μm, preferably from 100 to 600 μm, and the average particle size would be from 150 to 300 μm.

The drying may be carried out under atmospheric pressure for under reduced pressure. The heating temperature may vary depending upon the conditions, but is usually from 50 to 200° C. The operation may be carried out in a batch system or in a continuous system. The drying is usually carried out to such a degree that the water content would be from 1 to 30 wt %.

The dry silica gel powder thus obtained is calcined to obtain a synthetic quartz glass powder. In such a case, the heating is carried out finally within a temperature range of from 1000 to 1300° C. to form non-porous synthetic quartz glass powder. However, it is preferred to sufficiently remove, before closing of pores of the gel takes place, the adsorbed alcohol or the carbon component derived from alkoxy groups by maintaining the silica gel powder within a temperature range of from 300 to 600° C., whereby bubbles can be prevented when the obtained synthetic quartz glass powder is melt-formed to obtain a shaped product of glass.

Further, the atmosphere for calcining is preferably an oxygen-containing atmosphere up to at least about 600° C. Further, in order to obtain a quartz glass powder having a low content of silanol groups, calcining is preferably carried out while introducing into the system a gas having a dew point of at most −20° C., preferably at most −40° C. The gas to be introduced here, is preferably one preliminarily filtered through a filter so that impurities such as a metal mist, would not enter into the system. With respect to the ability of the filter, it is so selected so that particles of at least 1 μm, preferably at least 0.5 μm, can be removed. Further, the material for the filter is preferably a high purity organic polymer type, specifically one made of polypropylene or teflon. One having a high ash content, particularly one having a high content of alkali metals or alkaline earth metals, is not preferred even if it is of an organic polymer type. The time for maintaining at the maximum temperature for calcining is usually within a range of from 10 to 100 hours, although the time for maintaining may vary, as the decreasing rate of silanol groups varies depending upon the temperature.

Whether or not the final product obtained by melt-forming the obtained synthetic quartz glass powder, is readily crystallizable, can be predicted by the following accelerated evaluation method. Namely, 50 g of a synthetic quartz glass powder obtained, is put into a crucible and vacuum-melted at a temperature of from 1750 to 1850° C. to obtain an ingot. This ingot is then maintained within a range of from 1500 to 1650° C., for from 3 to 10 hours, and then cooled. When the interior of the ingot is observed, white spherical modified portions having a size of from a few tens μm to 1 mm may sometimes be observed, and they are problematic "devitrification spots". As a result of extensive studies, it has been found that there is a substantial interrelation between the number of the "devitrification spots" formed and the crystallization which takes place during the use of the shaped final product, and that if a quartz glass part material for production of a semiconductor to be used at a high temperature, such as a crucible for pulling up a silicon single crystal, is prepared by using a synthetic quartz glass powder whereby when its ingot is maintained at 1630° C. for 5 hours, devitrification spots having sizes of larger than 20 μm in diameter formed in the ingot, are at most 10 spots/50 g, preferably at most 5 spots/50 g, even if such a quartz glass part material is used under usual conditions, there will be no crystallization phenomenon of glass which becomes problematic.

Now, the present invention will be described in further detail with reference to Examples. However, it should be understood that the present invention is by no means restricted to such specific Examples.

EXAMPLE 1

High purity tetramethoxysilane and water were charged into a ribbon blender-type reactor, then hydrolyzed and geled. Immediately prior to charging into the reactor, each of tetramethoxysilane and water was passed through a polypropylene filter having an average opening diameter of 0.1 μm (absolute filtration precision: 0.15 μm). The obtained gel was pulverized and then vacuum-dried to obtain a dry gel powder, which was classified by a vibration sieve into a range of from 100 to 500 μm. For the entire line from the hydrolysis to the classification, the operation was carried out in a completely closed system, and the inner surfaces of the reactor and the classifier, which were in contact with the powder, were lined with high purity teflon. The classified dry gel was charged into a quartz crucible, and after putting a cover made of quartz glass, the crucible was set in an electric furnace. This quartz glass cover had a small hole, through which a quartz glass tube was inserted, and while supplying an air having a dew point of at most −40° C. constantly, calcining was carried out finally at 1200° C. for 45 hours. With respect to this supplied air, it was dehumidified to a dew point of at most −40° C. and then passed through a filter made of polypropylene having an average opening diameter of 0.1 μm (absolute filtration precision: 0.15 μm) and then introduced into the crucible. After completion of the calcining, the powder was taken out, and 50 g thereof was put into a crucible made of graphite and vacuum-melted at 1800° C. to obtain an ingot. This ingot was maintained in an argon gas atmosphere at 1630° C. for 5 hours and then cooled, whereupon the interior of the obtained ingot was observed by a microscope, whereby no devitrification spots having sizes of larger than 20 μm in diameter, were observed. On the other hand, by using a platinum crucible, 10 g of the powder after calcining, was dissolved by hydrofluoric acid and evaporated to dryness, whereupon the obtained residue was extracted under heating with an aqueous nitric acid solution, and concentrations of main impurities were measured by ICP analysis, whereby the results are as shown in Table 1. Using the same synthetic quartz glass powder as used for the preparation of this ingot, a quartz crucible was prepared by an arc melting method. In the obtained crucible, metal silicon was charged and heated at a temperature of 1500° C. for 50 hours. Then, it was cooled, and the quartz crucible was inspected, whereby no crystallization which would be problematic, was observed in the interior of the glass.

EXAMPLE 2

A synthetic quartz glass powder was prepared in the same manner as in Example 1 except that in Example 1, the filter for filtration of the starting material tetramethoxysilane and water was changed to one having an average opening diameter of 2 μm (absolute filtration precision: 2.5 μm), and the filter for the gas introduced during the calcining, was changed to one having an average opening diameter of 2 μm (absolute filtration precision: 2.5 μm). The obtained synthetic quartz glass powder was melted and subjected to heat treatment in the same manner as in Example 1, whereupon the interior of the ingot was inspected by a microscope, whereby devitrification spots of larger than 20 μm in diameter were observed in an amount of 3 spots/50 g. However, with respect to the concentrations of impurities by the ICP analysis, no significant difference from Example 1 was observed, as shown in Table 1. Using this synthetic quartz glass powder, a quartz crucible was prepared by an arc melting method, and in the obtained crucible, metal silicon was charged and heated at a temperature of 1500° C. for 50 hours. Then, it was cooled, and the quartz crucible was inspected, whereby a few portions which appeared to be crystallized spotwisely, were observed, but crystallization was not a problematic level.

COMPARATIVE EXAMPLE 1

A synthetic quartz glass powder was prepared in the same manner as in Example 1 except that the starting material tetramethoxysilane and water were used without filtration by a filter, also the gas to be introduced during the calcining was supplied without filtration by a filter, and in the classification step, as tapping balls used to prevent the clogging of the sieve, ones made of natural rubber, were used. The obtained synthetic quartz glass powder was melted and subjected to heat treatment in the same manner as in Example 1, and then the interior of the ingot was inspected by a microscope, whereby devitrification spots having sizes of larger than 20 μm in diameter were observed in an amount of 36 spots/50 g. However, with respect to the concentrations of impurities by the ICP analysis, no significant difference from Examples 1 and 2 was observed as shown in Table 1. Using this synthetic quartz glass powder, a quartz crucible was prepared, and in the obtained quartz crucible, metal silicon was charged and heated at 1500° C. for 50 hours. Then, it was cooled, and the quartz crucible was inspected, whereby crystallization was observed over a wide range on the inner surface of the crucible.

TABLE 1

Results of ICP analysis of impurities and evaluation of devitrification spots at 1630° C.

|  |  | Example 1 | Example 2 | Comparative Example 1 |
|---|---|---|---|---|
| Analytical values by ICP (ppm) | Na | <0.01 | <0.01 | <0.01 |
|  | K | <0.01 | <0.01 | <0.01 |
|  | Li | <0.01 | <0.01 | <0.01 |
|  | Ca | 0.01 | 0.01 | 0.01 |
|  | Mg | <0.01 | <0.01 | <0.01 |
|  | Fe | 0.06 | 0.05 | 0.05 |
|  | Cr | 0.01 | 0.01 | 0.01 |
|  | Ni | <0.01 | <0.01 | <0.01 |
|  | Al | 0.01 | 0.01 | 0.01 |
|  | Cu | 0.01 | 0.01 | 0.01 |
|  | Mo | <0.01 | <0.01 | <0.01 |
|  | W | <0.01 | <0.01 | <0.01 |
|  | B | 0.01 | 0.01 | 0.01 |
|  | P | 0.04 | 0.05 | 0.05 |
| Devitrification spots of larger than 20 μm. At 1630° C. for 5 hours (spots/50 g) |  | 0 | 3 | 36 |

What is claimed is:

1. A method for producing a synthetic quartz glass powder, which comprises drying and calcining a gel obtained by hydrolyzing an alkoxysilane with water, wherein at least the alkoxysilane is preliminarily passed through a filter prior to said initiation of said hydrolyzing.

2. The method for producing a synthetic quartz glass powder according to claim 1, wherein the filter has an absolute filtration precision of at most 0.5 μm.

3. The method for producing a synthetic quartz glass powder according to claim 1, wherein the filter has an absolute filtration precision of at most 0.3 μm.

4. The method for producing a synthetic quartz glass powder according to claim 1, wherein multi-stage filter is used as the filter, and at least the alkoxysilane is sequentially passed through filters having absolute filtration precisions of at most 0.5 μm, at most 0.2 μm and at most 0.1 μm, respectively.

5. A process for producing a silica gel, which comprises hydrolyzing an alkoxysilane with water, wherein at least the alkoxysilane with water is preliminarily passed through a filter prior to initiation of said hydrolyzing.

6. The method according to claim 1, wherein white devitrification spots having sizes larger than 20 μm in diameter formed in an ingot obtained by vacuum melting the synthetic quartz powder at a temperature of from 1780 to 1800° C. to form an ingot, followed by maintaining the ingot at a temperature of 1630° C. for 5 hours, are at most 10 spots/50 g.

7. The method according to claim 5, wherein white devitrification spots having sizes of larger than 20 μm in diameter formed in an ingot obtained by calcining a powder of the silica gel to form a synthetic quartz powder and vacuum melting the synthetic quartz powder at a temperature of from 1780 to 1800° C. to form an ingot, followed by maintaining the ingot at a temperature of 1630° C. for 5 hours, are at most 10 spots/50 g.

8. The method according to claim 6, wherein the filter has an absolute filtration precision of at most 0.5 μm.

9. The method according to claim 6, wherein the filter has an absolute filtration precision of at most 0.3 μm.

10. The method according to claim 6, wherein a multi-stage filter is used as the filter, and at least one of the alkoxysilane and water is sequentially passed through filters having an absolute filtration precision of at most 0.5 μm, at most 0.2 μm and at most 0.1 μm, respectively.

11. The method according to claim 7, wherein the filter has an absolute filtration precision of at most 0.5 μm.

12. The method according to claim 7, wherein the filter has an absolute filtration precision of at most 0.3 μm.

13. The method according to claim 7, wherein a multi-stage filter is used as the filter, and at least one of the alkoxysilane and water is sequentially passed through filters having an absolute filtration precision of at most 0.5 μm, at most 0.2 μm and at most 0.1 μm, respectively.

14. The method according to claim 1, wherein both the alkoxysilane and the water are preliminarily passed through a filter.

15. The method according to claim 5, wherein both the alkoxysilane and the water are preliminarily passed through a filter.

16. The method according to claim 6, wherein both the alkoxysilane and the water are preliminarily passed through a filter.

17. The method according to claim 7, wherein both the alkoxysilane and the water are preliminarily passed through a filter.

* * * * *